No. 766,941. PATENTED AUG. 9, 1904.
D. E. EDDLEMAN.
METAL SHEARING DEVICE.
APPLICATION FILED JAN. 4, 1904.
NO MODEL. 2 SHEETS—SHEET 1.
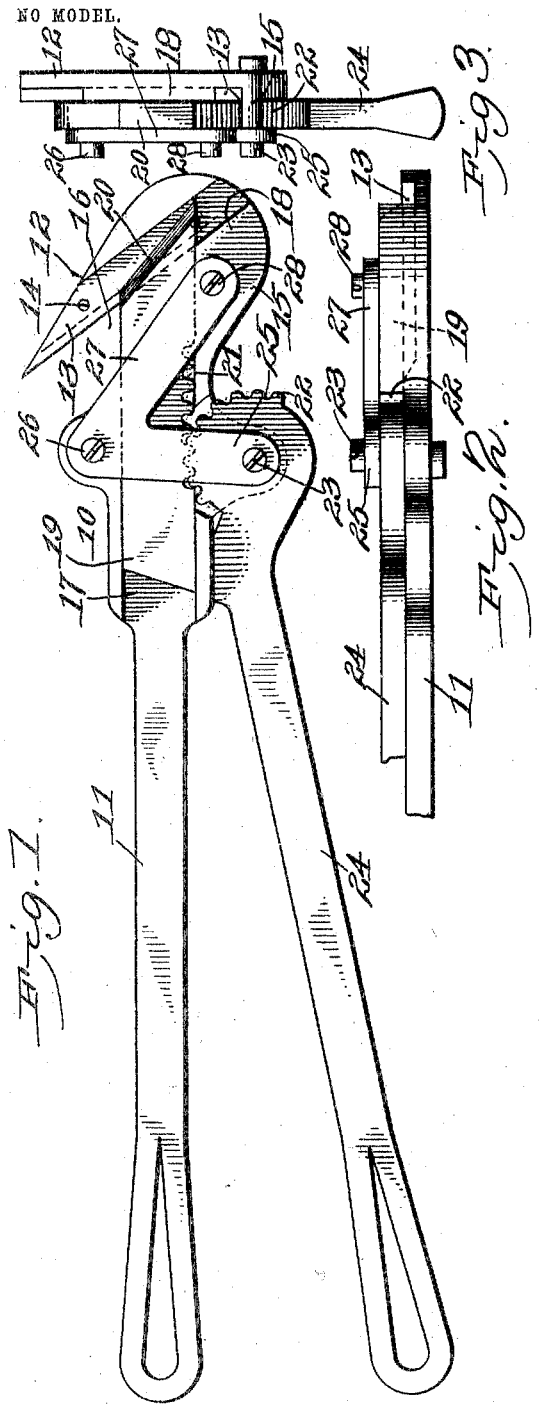
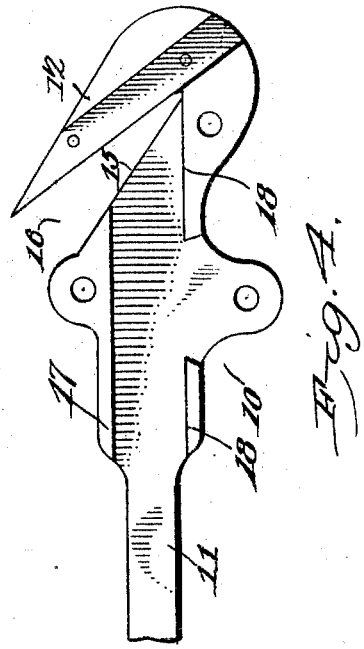
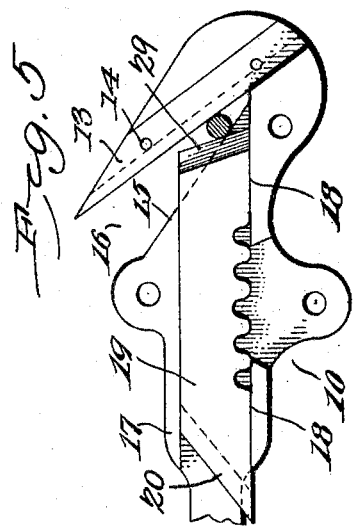
Witnesses
E. F. Stewart
C. N. Woodward
Dudley E. Eddleman, Inventor.
by C. A. Snow & Co.
Attorneys

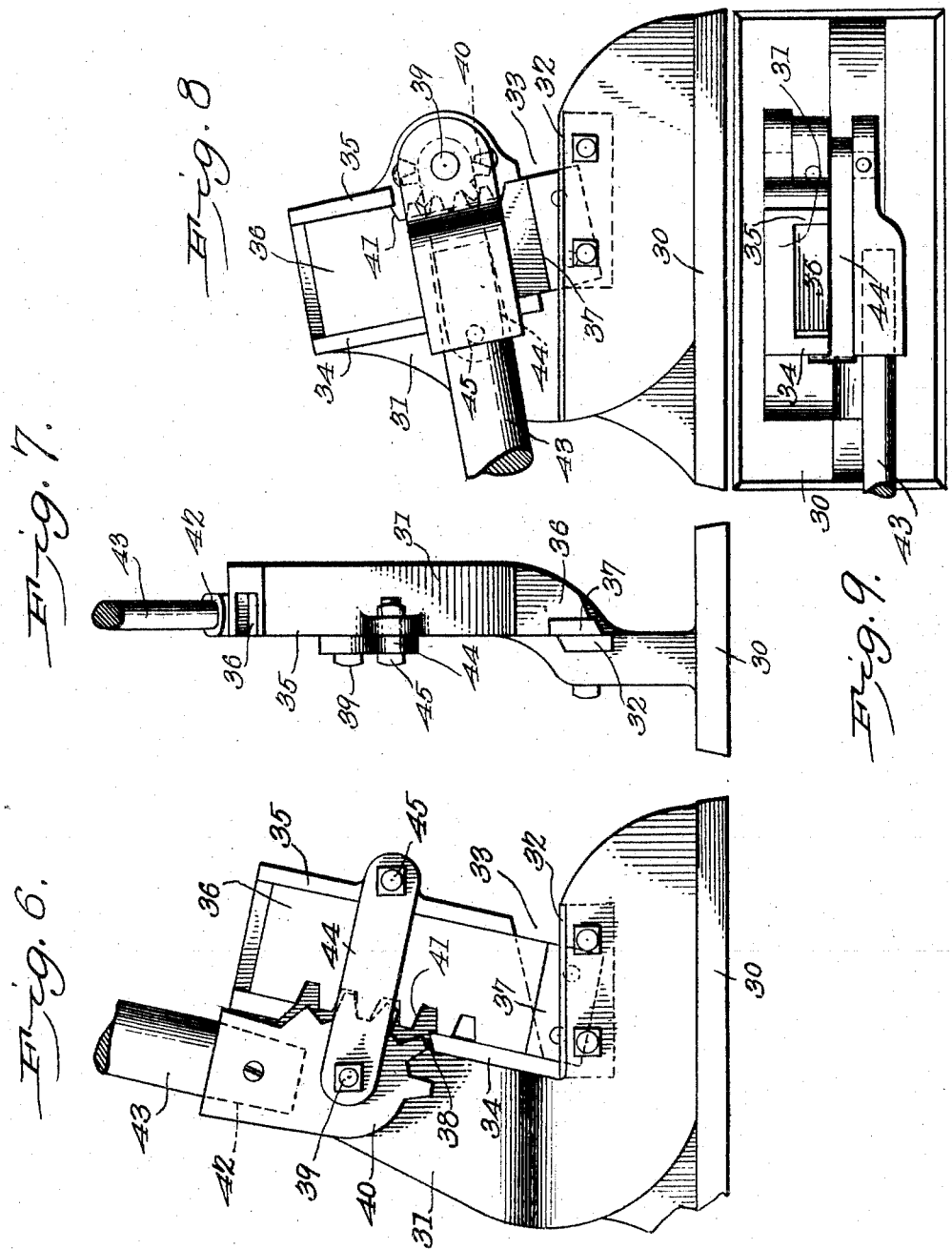

No. 766,941. Patented August 9, 1904.

UNITED STATES PATENT OFFICE.

DUDLEY E. EDDLEMAN, OF WEATHERFORD, TEXAS, ASSIGNOR OF THREE-FOURTHS TO HAYS McFARLAND AND EZRA A. FRANTZ, OF WEATHERFORD, TEXAS.

METAL-SHEARING DEVICE.

SPECIFICATION forming part of Letters Patent No. 766,941, dated August 9, 1904.

Application filed January 4, 1904. Serial No. 187,713. (No model.)

*To all whom it may concern:*

Be it known that I, DUDLEY E. EDDLEMAN, a citizen of the United States, residing at Weatherford, in the county of Parker and State of Texas, have invented a new and useful Metal-Shearing Device, of which the following is a specification.

This invention relates to implements for shearing metal, more particularly for severing the bands of cotton-bales, but which may be employed for any other purpose for which it is adapted, and has for its object to produce a device of great power and force which may be cheaply manufactured and readily adapted for the heaviest or lightest work; and the invention consists in certain novel features of construction, as hereinafter shown and described, and specified in the claims.

In the drawings illustrative of the invention, in which corresponding parts are denoted by like designating characters, Figure 1 is a side elevation of the preferred form of this improved device. Fig. 2 is a bottom plan view. Fig. 3 is an end elevation of the implement. Fig. 4 is a detail view of the forward or operative end of the stock, illustrating its construction. Fig. 5 is a view similar to Fig. 4, illustrating the cutting-plate reversed. Fig. 6 is a side elevation of a modified form of the invention, and Fig. 7 is a front elevation of this form of the machine. Fig. 8 is a view similar to Fig. 6, illustrating a still further modified form of construction. Fig. 9 is a plan view of the structure shown in Fig. 8.

The improved implement shown in Figs. 1 to 5 comprises a stock or body portion 10, having a handle 11 of any suitable form at one end and an inclined hook-shaped jaw 12 at the other end, the inner side of the jaw having a shear-plate 13 connected detachably thereto, as by screws 14, and spaced from the inclined end 15 of the stock, whereby a V-shaped recess 16 is formed transversely of the stock and inclined rearwardly or toward the handle 11, as shown.

The stock is provided with spaced longitudinal guideways 17 18, the guideway 18 extending in advance of the inner end of the V-shaped recess 16, as shown. Slidably disposed between the guideways 17 18 is a blade 19, having a relatively long inclined cutting or "shear" edge 20 at one end and a relatively short and reversely-inclined cutting or shear edge 29 at the other end, as shown more clearly in Fig. 5. The blade 19 is slidable between the guideways 17 18 and reversible therein, so that its oppositely-located cutting edges may be alternately operated in conjunction with the shear-plate 13, as will be obvious.

The relatively long shear edge 20 causes an object placed in the recess 16 to be severed from within outwardly and with a correspondingly long inclined shearing cut, while the shorter or more abrupt shear edge 29 causes an object to be severed from without inwardly and with a correspondingly short or abrupt shear cut.

The longer shear cut will be employed where the greater resistance is encountered, as the longer cut is the more powerful, while the more abrupt action will be more desirable where less resistance is encountered. Then again the arrangement whereby the cutting action is imparted from within outwardly will be employed upon flat objects, such as bands and similarly-formed objects, while the arrangement whereby the cutting action is imparted from without inwardly will be preferable when round objects, such as rods and the like, are to be severed, as the pressure by this arrangement being inwardly will prevent the round object rolling outwardly from the cutting members, as will be obvious by reference to Fig. 5. Thus the implement may be quickly adapted for action upon different forms of materials and without change in the structure except to simply reverse the position of the plate 19.

The plate 19 is provided with a longitudinal gear-rack 21 along one edge, and the stock 10 is provided with a gear-segment 22 pivoted thereto, as at 23, for engagement with the rack and provided with an operating-handle 24, as shown. A keeper-bar 25 is disposed over the plate 19, being connected by one end to the pivot 23 and by the other end to the guideway 17, as by screw 26. The keeper-bar is provided with an integral arm 27, extending in an inclined position substantially in alinement with the inclined end 15 of the stock 10 and connected to the guideway 18, as by screw 28, adjacent to the inner end of the recess 16, as shown. By this simple arrangement the plate 19 is firmly supported and held not only from lateral movement by the keeper-bar 25 and its inclined arm 27, but from transverse movement by the guideways 17 18, and especially by the latter, whose forward end is projected beneath the plate adjacent to the recess 16, in which the cutting operation takes place, thus supporting the plate where the greatest transverse thrust and strain occurs and where the greatest support is required. The inclined arm 27 also performs an important function in this respect, as the lateral support is imparted at a point nearest the end of the plate where the cutting action for the time being occurs.

The improved device shown in Figs. 6 to 9 comprises a base portion 30, having an integral standard 31 extending therefrom at an angle to its horizontal plane and offset therefrom, as shown in Fig. 7, and provided with a shear-blade 32, horizontally disposed opposite a V-shaped recess 33, as shown.

Integral with the standard 31 are spaced guideways 34 35, and slidably disposed between these guideways is a plate 36, having a shear-blade 37 attached to its free end for coaction with the shear-blade 32 upon the base member 30. The cutting edge of the shear-blade 37 is at right angles to the longitudinal plane of the member 36, and consequently acts diagonally or with a shear cut relative to the stationary blade 32, as will be obvious. The guideway 34 is provided with an opening 38 and pivoted at 39 to the standard 31, and operating through this opening is a gear-segment 40 for engagement with a gear-rack 41 upon the plate 36. The segment 40 is provided with a socket 42 for an operating-handle 43. Extending across the plate 36 is a keeper-bar 44, connected at one end to the guideway 35, as by screw 45, and connected by the other end to the pivot 39 at the segment 40, as shown. The keeper-bar thus serves a twofold purpose—first, as a support for the pivot 39 and segment 40, and, second, as a support to the plate 36 to prevent lateral movement thereof. By this simple arrangement a very compact, strong, and efficient shearing device is produced by which a shearing cut is produced upon the metal being cut by a direct-acting movable jaw member, thus eliminating lateral thrust or strains, as the resistance is almost entirely longitudinally of the movable jaw.

In Figs. 8 and 9 a modified form of the structure is shown, consisting in inclining the standard 31 and slidable plate 36 reversely to the position shown in Fig. 1 and with the segment 40 and rack 41 located at the opposite side of the plate 36 and of the standard 31; but this will not be a departure from the principle of the invention or sacrifice any of its advantages, as the mode of operation and results produced are the same in both forms of the structure illustrated.

In the modification shown in Figs. 8 and 9 the operating-handle 43 is so located that the operator stands in the rear of the machine while operating it, which may be found advantageous under some circumstances. A machine of great force and power may thus be constructed of comparatively light materials, which is compact and strong and the parts thereof arranged and combined to exert the maximum of force with the expenditure of the minimum of power.

Generally the base member will be erected upon a bench or stand of convenient size, and the machine may be adapted for severing bands or bars of metal of various sizes and may be constructed of any required size or capacity required.

The machine will be found especially adapted for severing cotton-bale bands and similar articles while being manufactured, wherein it is frequently desired to sever the bands in bundles or in numbers at the same time and requiring a relatively strong machine to accomplish it.

With this simple device as many of the bands may be severed at the same time as the V-shaped recess will hold.

Having thus described the invention, what I claim is—

1. In an implement of the class described, a stock having at one end a rearwardly-inclined V-shaped recess provided with an inclined cutting-blade and with spaced longitudinal guideways, a plate slidably disposed between said guideways and having inclined cutting edges at the ends for coaction with the cutting edge of said blade, and provided with a longitudinal gear-rack, a lever-arm pivoted to said stock and provided with a gear-segment for engagement with said gear-rack, and a keeper embracing said plate and connected to said stock at opposite sides thereof, substantially as described.

2. In an implement of the class described, a stock having at one end a rearwardly-inclined hook-shaped jaw provided with an inclined cutting-blade upon its inner side and with spaced longitudinal guideways, a plate slidably disposed between said guideways and having inclined cutting edges at the ends for coaction with the cutting edge of said hook-shaped jaw, and provided with a longitudinal gear-rack, a lever-arm pivoted to said stock and provided with a gear-segment for engagement with said gear-rack, and a keeper embracing said plate and connected to said stock at opposite sides thereof and having an arm extending diagonally therefrom and in substantial alinement with the forward inclined end of the stock, and connected by its free end to said stock adjacent to its juncture with said hook-shaped jaw, substantially as described.

3. In an implement of the class described, a stock having at one end a rearwardly-inclined hook-shaped jaw provided with an inclined cutting-blade upon its inner side and with spaced longitudinal guideways, a plate slidably disposed between said guideways and reversible therein and having at the ends reversibly-inclined cutting edges for alternate coaction with the cutting-blade upon said inclined jaw, whereby the object to be severed is acted upon from within outwardly by one cutting portion of said reversible plate and from without inwardly by the other end thereof, and means carried by said stock, for forcibly actuating said slidable plate, substantially as described.

4. In an implement of the character described, a stock having a work-receiving seat disposed transversely thereof with its walls converged inwardly from its open end, a stationary cutting-blade having its cutting edge disposed substantially parallel with one side of the seat, a guideway leading to the opposite side of the seat, a reciprocating cutter working in the guideway and having its cutting edge disposed substantially parallel with said opposite side of the seat, and means to work the reciprocating cutter in the guideway.

5. In an implement of the character described, a stock having an inwardly-tapered work-receiving seat inclined transversely across the stock, a stationary cutter-blade at one side of the seat, a guideway leading to the opposite side of the seat, a reciprocating cutter working in the guideway and coöperating with the stationary cutter, a pinion carried by the stock and meshing with the rack, and a handle for the pinion.

6. In an implement of the character described a stock having a tapered work-receiving seat disposed transversely thereof, a stationary cutter-blade at one side of the recess, a guideway leading to the opposite side of the recess, a reciprocating cutter working in the guideway and coöperating with the stationary cutter, a rack carried by one edge of the reciprocating cutter, a handled gear-segment mounted upon the stock and meshing with the rack, and a keeper lying across the guideway and the reciprocating cutter with one end connected to the pivotal support of the gear-segment to brace the latter.

7. In an implement of the character described, a stock having one end provided with a handle an inwardly-tapered work-receiving recess disposed transversely at the opposite end of the stock, intermediate substantially parallel flanges carried by the stock and forming a guideway leading to the inner side of the work-receiving recess, one of the flanges having an opening therein and the stock having a lateral extension adjacent said opening, a stationary cutter-blade carried by the stock at the outer side of the work-receiving recess, a reciprocating cutter working in the guideway and provided with a rack which is exposed through the opening in one of the flanges, a gear-segment mounted upon the lateral extension of the stock with its peripheral edge working in the opening of the adjacent flange and coöperating with the rack of the reciprocating cutter, and a handle connected to the segment and disposed at one side of the handle of the stock for simultaneous operation therewith.

In testimony that I claim the foregoing as my own I have hereto affixed my signature in the presence of two witnesses.

DUDLEY E. EDDLEMAN.

Witnesses:
D. L. SEXTON,
G. W. MOORE.